(12) United States Patent
Ikeda et al.

(10) Patent No.: US 6,816,861 B2
(45) Date of Patent: Nov. 9, 2004

(54) CAD INFORMATION MANAGEMENT SYSTEM AND CAD INFORMATION MANAGEMENT METHOD

(75) Inventors: Haruhiko Ikeda, Hitachi (JP); Norikazu Hamaura, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 112 days.

(21) Appl. No.: 09/941,755

(22) Filed: Aug. 30, 2001

(65) Prior Publication Data

US 2002/0107846 A1 Aug. 8, 2002

(30) Foreign Application Priority Data

Feb. 8, 2001 (JP) .......................................... 2001-032268

(51) Int. Cl.$^7$ ............................................. G06F 17/30
(52) U.S. Cl. ........................ 707/10; 707/104.1; 700/96; 700/106
(58) Field of Search ............................ 700/96, 97, 98, 700/99, 104, 106, 182; 707/103, 104.1, 10

(56) References Cited

U.S. PATENT DOCUMENTS 5,506,984 A * 4/1996 Miller .......................... 707/10
6,289,254 B1 * 9/2001 Shimizu et al. ................ 700/96
6,346,885 B1 * 2/2002 Curkendall ............... 340/572.4
6,377,964 B1 * 4/2002 Sano ........................... 715/530

FOREIGN PATENT DOCUMENTS

JP          9-62728         3/1997
JP          9-91327         4/1997

* cited by examiner

*Primary Examiner*—Charles Rones
(74) *Attorney, Agent, or Firm*—Mattingly, Stanger & Malur, PC

(57) ABSTRACT

Databases store therein CAD drawings which different manufacturers have. Other databases store therein equipment specifications. All the databases are connected to a user terminal via a communication line. Data stored-destination address information is inputted to designate information on the CAD drawing or the equipment specification, from a user terminal, and one of the databases is searched based on the data stored-destination address information, thereby selecting the information on the CAD drawing or the equipment specification is selected from one of the databases, corresponding to the data-stored destination address information, based on the search.

9 Claims, 6 Drawing Sheets

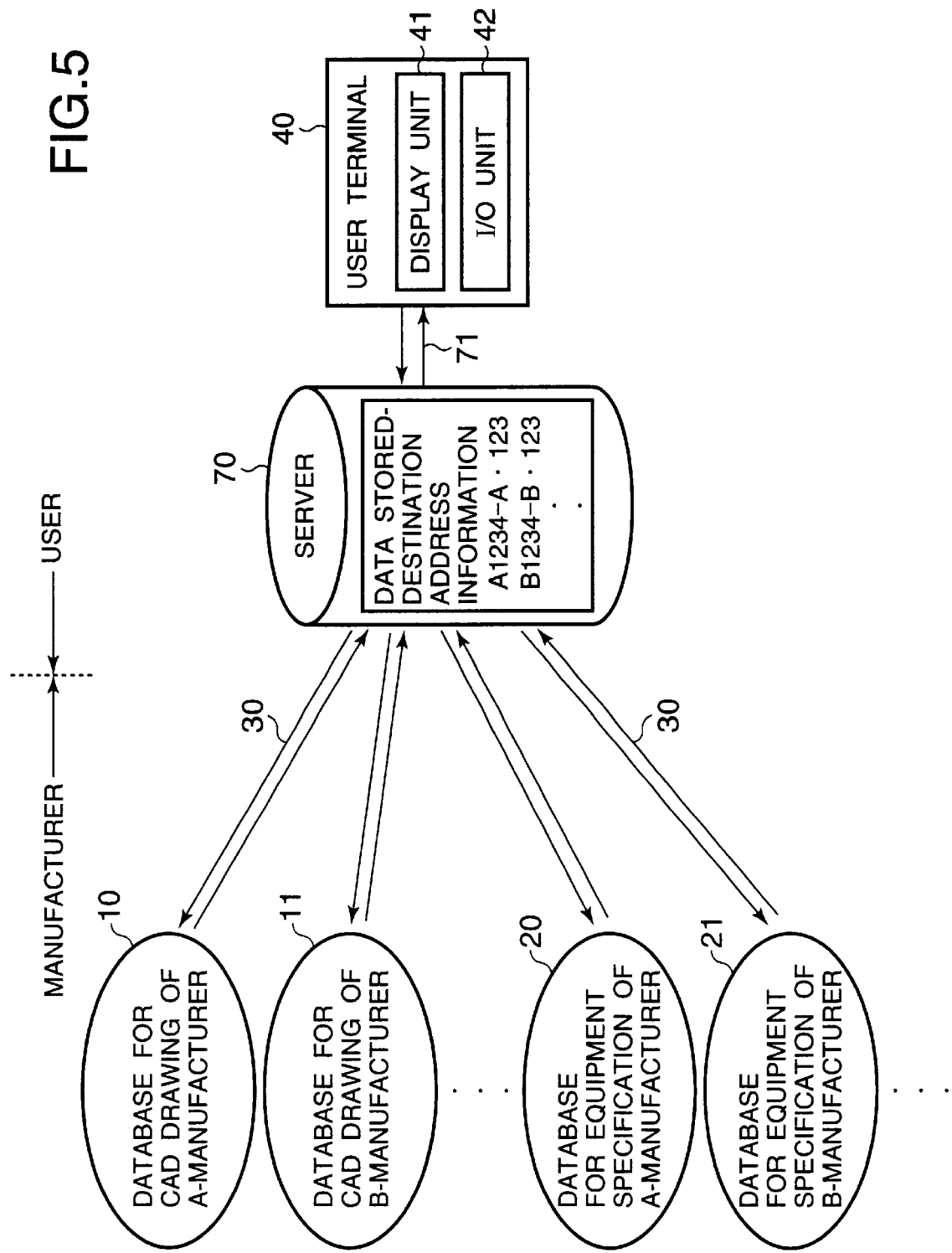

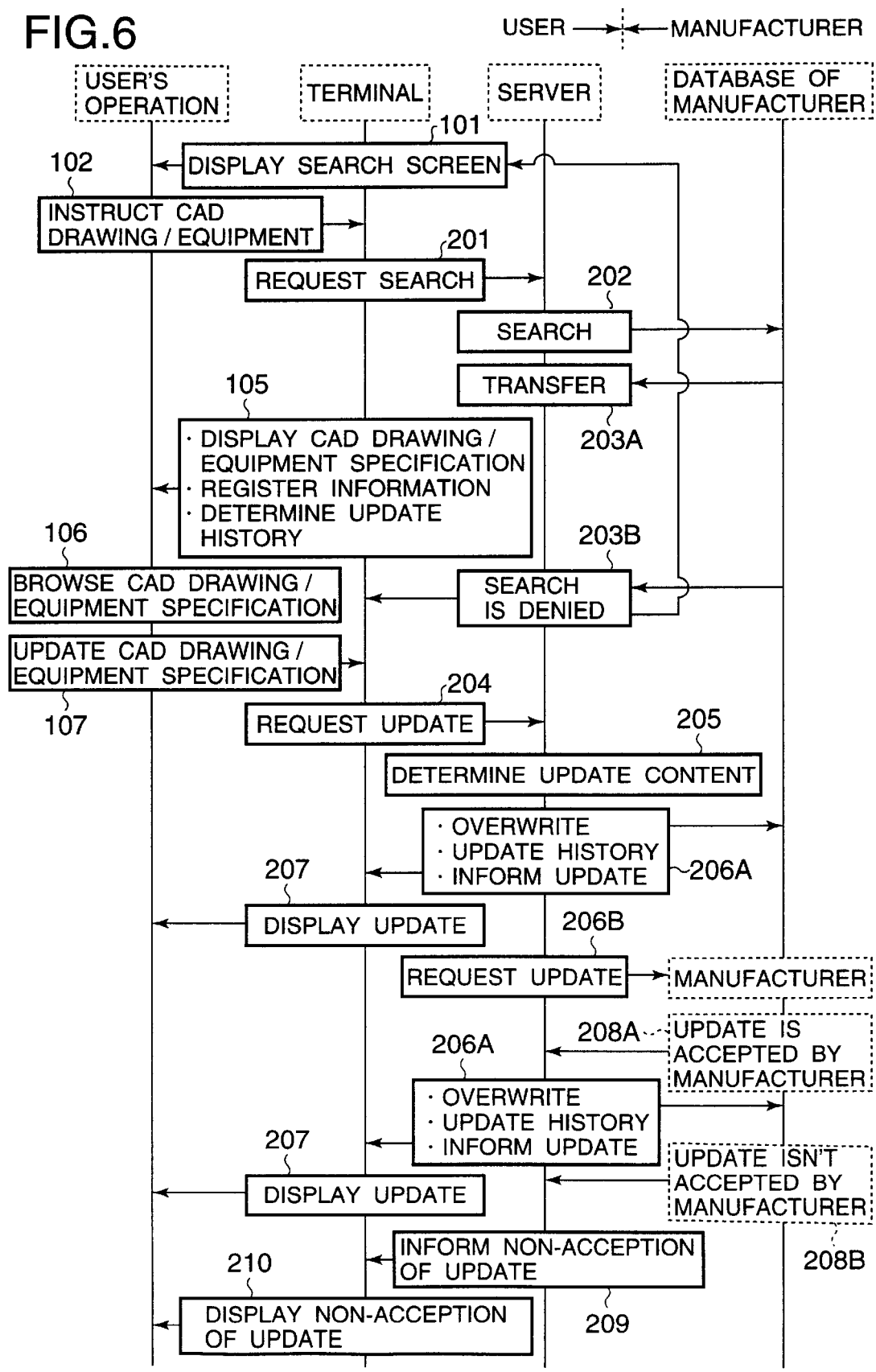

CAD INFORMATION MANAGEMENT SYSTEM AND CAD INFORMATION MANAGEMENT METHOD

BACKGROUND OF THE INVENTION

1. Field of the Invention

The present invention relates to a CAD management system and a CAD information management method, and more particularly, to a CAD management system and a CAD information management method which are suitable to manage CAD drawing information.

2. Description of the Related Art

A computer forms a drawing to design various pieces of equipment. As disclosed in Japanese Unexamined Patent Application Publication No. 9-91327 and in Japanese Unexamined Patent Application Publication No. 9-62728, in the case of managing CAD (Computer Aided Design) drawing information which is formed by a computer, CAD drawings such as P&ID (Piping and Instrumentation Diagram) are used by one plant manufacturer or by one information management company. The CAD drawings do not consider a case in which an order company of a power generation plant or the plant manager uses a database under the plant manufacturer or the information manager.

Conventionally, a company which forms the CAD drawing stores CAD drawing information in its own database and the plant manufacturer or information manager which forms the CAD drawing information uses the individual database. Therefore, when the order company of the power generation plant or the plant manager uses the database which the plant manufacturer or the information manager has, information on the CAD drawing and an equipment specification is temporarily extracted from the database which the power generation plant manufacturer or the information manager has, the extracted information is fetched to the database which is managed by the order company of the plant or the plant manager. Consequently, new information such as progressing status of a periodical check or replacement of equipment is recorded to the database which the order company of the plant or the plant manger has, different from the database which the plant manufacturer or the information manager has, and is managed by the order company of the plant or the plant manger.

According to the above conventional arts, when the order company of the plant or the plant manager uses the CAD drawing or the equipment specification information which a plurality of plant manufacturers or a plurality of information managers have, the database which the plant manufacturer has cannot be directly accessed. A database, different from that of the plant manufacturer, must be additionally provided. Consequently, it is troublesome that the order company of the plant or the like constructs a specific database. Further there is a problem in that since the order company of the plant and the plant manufacturer update information stored in the database in different manners, a difference is caused between the databases formed by the order company of the plant and the plant manufacturer. The information management by the order company of the plant becomes difficult. In particular, when a plurality of plant manufacturers manage information, even in the case of the same product, a difference between update information is caused.

SUMMARY OF THE INVENTION

It is an object of the present invention to provide a CAD information management system and a CAD management method in which even when CAD drawing information or specification information is distributionally stored in a plurality of databases, it can be easily browsed in accordance with stored-destination address information thereof.

To solve the problems, according to a first aspect of the present invention, there is provided a CAD information management system comprising: a plurality of databases for storing at least one of CAD drawing information and specification information on a specification of a component forming a CAD drawing, corresponding to stored-source address information; and a terminal connected to the plurality of databases via a communication network, for receiving and transmitting information to/from the plurality of databases based on input information, wherein when stored-destination address information indicating a stored destination of information is inputted as input information on the stored-source address information, the terminal searches for the stored-source address information of any of the plurality of databases in accordance with the stored-destination address information, selects information corresponding to the stored-source address information from any of the plurality of databases based on the search result, and outputs the selected information.

According to a second aspect of the present invention, there is provided a CAD information management system comprising: a plurality of databases for storing at least one of CAD drawing information and specification information on a specification of a component forming a CAD drawing and update history information of the at least one of the information, corresponding to stored-source address information; and a terminal connected to the plurality of databases via a communication network, for receiving and transmitting information to/from the plurality of databases based on input information, wherein when stored-destination address information indicating a stored destination of information is inputted as input information on the stored-source address information, the terminal searches for the stored-source address information of any of the plurality of databases in accordance with the stored-destination address information, selects at least one of the CAD drawing information and the specification information, corresponding to the stored-source address information, from any of the plurality of databases, based on the search result, displays the selected information, and also displays update information of the selected information.

According to a third aspect of the present invention, there is provided a CAD information management system comprising: a plurality of databases for storing at least one of CAD drawing information and specification information on a specification of a component forming a CAD drawing, together with update history information of the at least one of the information, corresponding to stored-source address information; a server connected to the plurality of databases via a communication network, for receiving and transmitting information to/from the plurality of databases; and a terminal connected to the server via an information transfer path, for receiving and transmitting information to/from the server based on input information, wherein when information on a stored destination of information is inputted as input information on the stored-source address information, the terminal requests a search in accordance with the input information to the server and displays the search result of the server, the server extracts the stored-destination address information corresponding to the information in response to the search request from the terminal, searches for the stored-source address information of any of the plurality of databases in accordance with the stored-destination address information, selects at least one of the CAD drawing information and the specification information, corresponding to the stored-source address information, from any of the plurality of databases, based on the search result, also selects update history information added to the at least one of the information, and transfers the selected information to the terminal.

Preferably, the CAD information management system may further comprise information management means for managing at least one of the CAD drawing information and the specification information. In the CAD information management system, the plurality of databases are connected to the information management means, the information management means outputs a result of determining whether or not the update request from the terminal is accepted, to the terminal, and when receiving the result of determining that the update request is accepted from the information management means, the terminal updates at least one of the CAD drawing information and the specification information in the plurality of databases, and adds the update history information on the update to the update information.

Further, preferably, in the CAD information management system, at least one of the CAD drawing information and the specification information is overlappingly stored in the plurality of databases.

According to a fourth aspect of the present invention, there is provided a CAD information management method comprising the steps of: by an information management apparatus connected to a communication network, storing at least one of CAD drawing information and a specification of a component forming a CAD drawing to a plurality of databases, corresponding to stored-source address information, and connecting the databases to a terminal via the communication network; and, by the terminal, searching for the stored-source address information of any of the plurality of databases in accordance with stored-destination address information indicating a stored destination of information, selecting information corresponding to the stored-source address information from any of the databases based on the search, and displaying the selected information, when inputting the stored-destination address information to the terminal, as input information on the stored-source address information, in the case in which the information management apparatus manages the CAD drawing information and the specification information that are stored in the plurality of databases.

Preferably, the CAD information management method may further comprise the steps of: by the information management apparatus, outputting a result of determining whether or not an update request from the terminal is accepted, to the terminal, when the update request is inputted to the information management apparatus from the terminal; and by the terminal, updating at least one of the CAD drawing information and the specification information in the plurality of databases, when receiving the result of determining that the update request from the information management apparatus is accepted, and adding update history information on update to the update information.

According to a fifth aspect of the present invention, there is provided a CAD information management method, comprising the steps of: by an information management apparatus connected to a communication network, storing at least one of CAD drawing information and specification information on a specification of a component forming a CAD drawing and update history information of the at least one of the information, in a plurality of databases, corresponding to stored-source address information, connecting the plurality of databases to a server via the communication network, and connecting the server to a terminal via an information transfer path; by the terminal, requesting a search in accordance with input information, to the server, and displaying the search result of the server; and by the server, extracting stored-destination address information corresponding to the information in response to the search request from the terminal, searching for the stored-source address information of any of the plurality of databases based on the stored-destination address information, selecting at least one of the CAD drawing information and the specification information, corresponding to the stored-source address information, from any of the plurality of databases, selecting update history information added to the selected information, and transferring the selected information to the terminal, when information on a stored destination of information is inputted to the terminal as the input information on the stored-source address information in the case in which the information management apparatus manages the CAD drawing information and the specification information which are stored in the plurality of databases.

According to the present invention, at least one of the CAD drawing information and the specification information is stored in a plurality of databases, corresponding to stored-source address information indicating a stored source. Therefore, when the stored-destination address indicating the stored destination of the information is inputted to the terminal, the information corresponding to the stored-source address information can selected from any of the databases and the selected information can be outputted or displayed, by searching for the stored-source address information from any of the databases in accordance with the stored-destination address information. In this case, even if the CAD drawing information or the specification information is distributionally stored in the databases, the CAD drawing information or the specification information can be easily browsed.

At least one of the CAD drawing information and the specification information is selected and displayed and the update information of the selected information is displayed. Therefore, it is easy to recognize a correcting status of the CAD drawing information or the specification information.

When the CAD drawing information or the specification information is searched via the server, the load of the terminal can be reduced. Further, the processing speed can be increased due to the process shared between the terminal and the server.

BRIEF DESCRIPTION OF THE DRAWINGS

FIG. 5 is a block diagram of the overall structure of a CAD information management system according to a second embodiment of the present invention; and FIG. 6 is a flowchart for explaining operations of the CAD information management system shown in FIG. 5.

DESCRIPTION OF THE PREFERRED EMBODIMENTS

Figure 1:
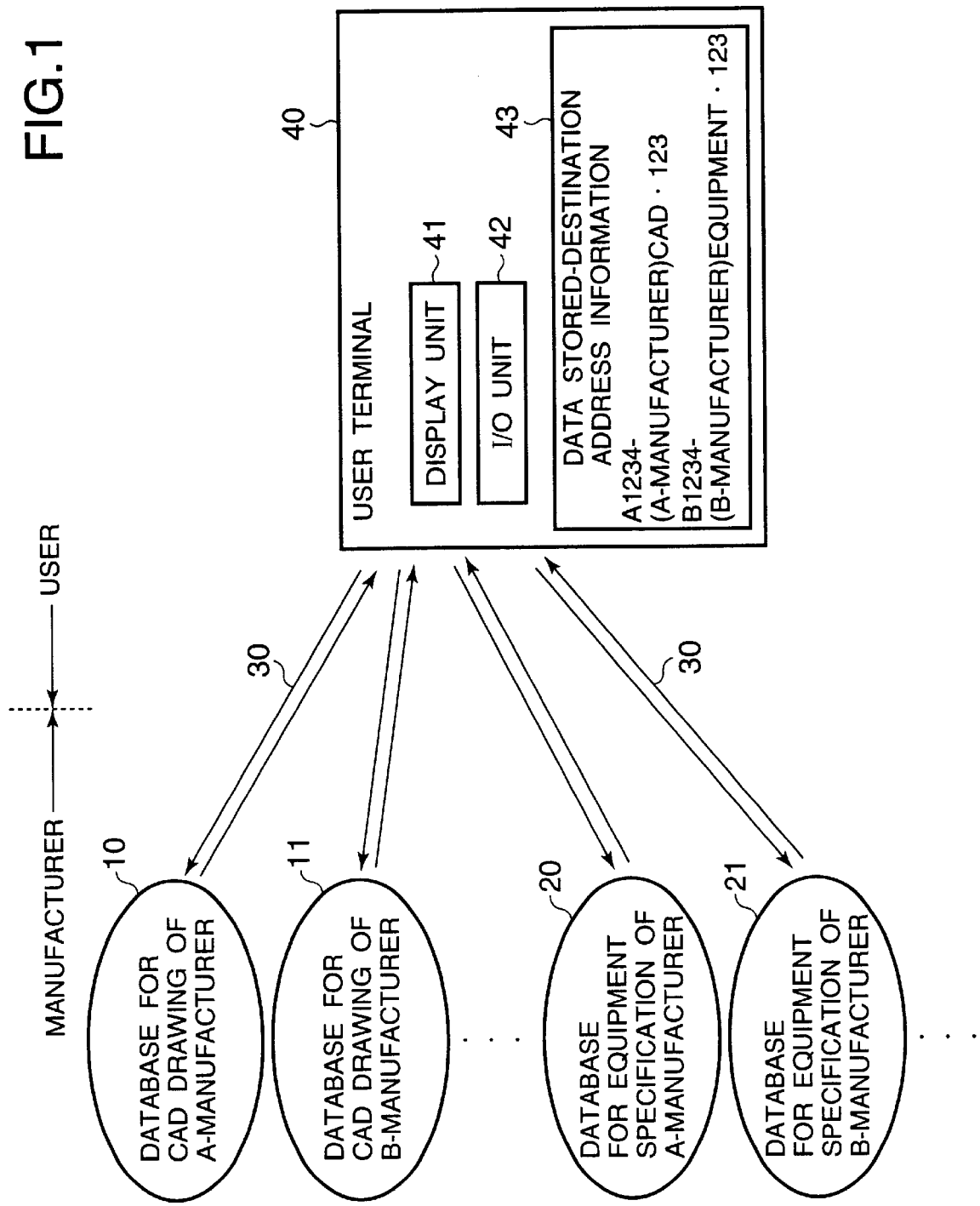
FIG. 1 is a block diagram of the overall structure of a CAD information management system according to a first embodiment of the present invention.

Hereinbelow, embodiments of the present invention will be described with reference to the drawings. FIG. 1 is a diagram showing the overall structure of a CAD information management system according to a first embodiment of the present invention. Referring to FIG. 1, reference symbols 10, 11, ..., 20, 21, ... denote databases which are managed by a plurality of different power generation plant manufacturers. CAD drawing information which an A-manufacturer has is stored in the database 10, corresponding to stored-source address information indicating a stored source thereof. CAD drawing information which a B-manufacturer has is stored in the database 11, corresponding to stored-source address information indicating a stored source thereof. Equipment specification information (specification information of a component forming the CAD drawing) which the A-manufacturer has is stored in the database 20, corresponding to the stored-source address information. Equipment specification information which the B-manufacturer has is stored in the database 21 to correspond to the stored-source address information. The databases 10, 11, ..., 20, 21, ... are connected to a user terminal 40 via a communication line 30, and are also connected to an information management apparatus (not shown) as information management means for managing information every manufacturer.

The user terminal 40 comprises a display unit 41, an input and output unit 42, an information registering unit 43, and the like.

Figure 2:
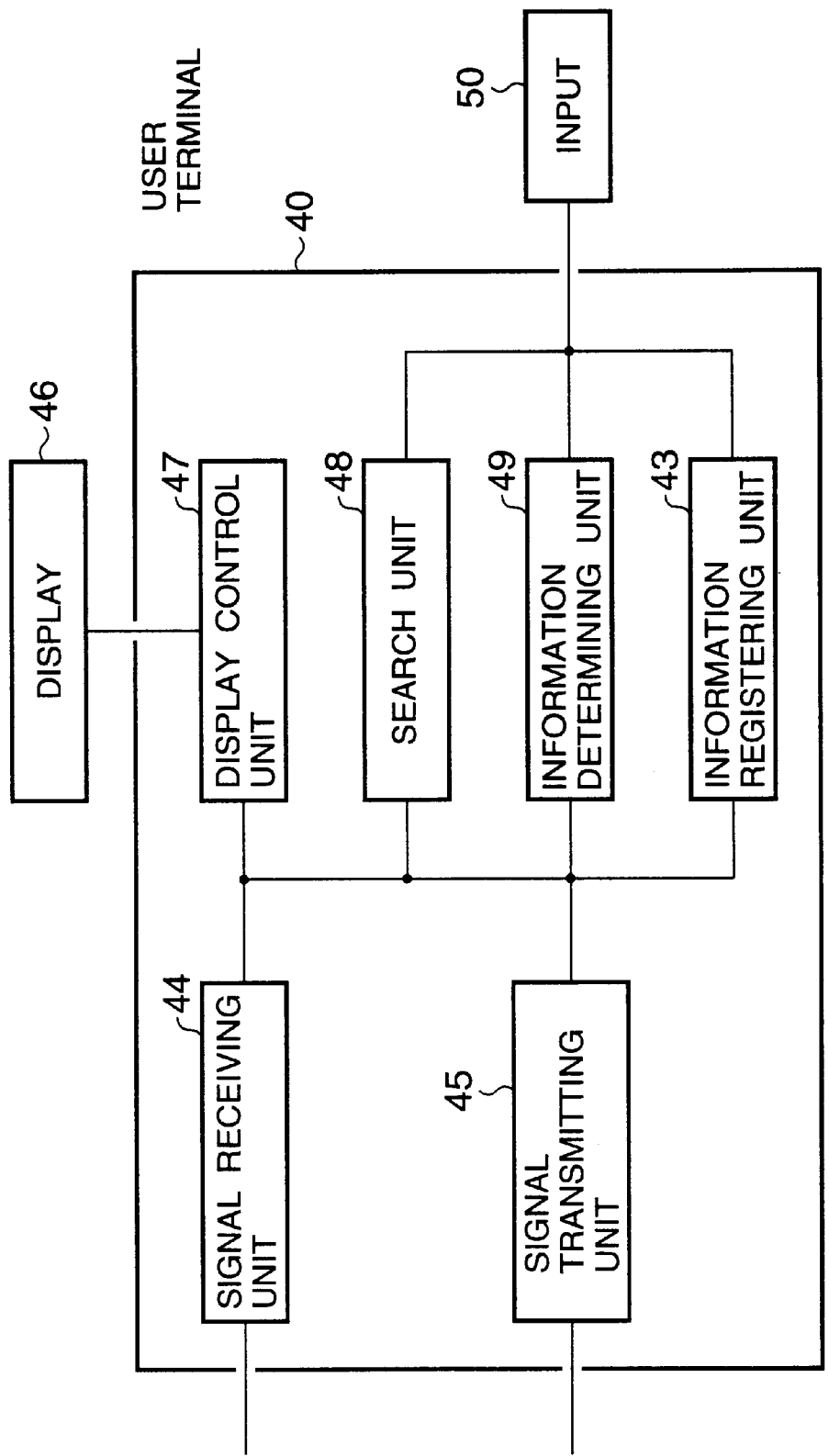
FIG. 2 is a block diagram of a user terminal in FIG. 1.

Referring to FIG. 2, specifically, the user terminal 40 comprises a signal receiving unit 44, a signal transmitting unit 45, a display 46, a display control unit 47, a search unit 48, an information determining unit 49, the information registering unit 43, and an input unit 50. The signal receiving unit 44 and the signal transmitting unit 45, serving as the input and output unit 42, are connected to the communication line 30. Information is received and transmitted among the databases via the communication line 30.

The input unit 50 comprises, for example, a keyboard. When inputting a search condition on a CAD drawing or an equipment specification necessary for a user, e.g., data stored-destination address information which indicates the stored destination of CAD drawing information or equipment specification information, the search unit 48 searches for the stored-source address information of any of the databases 10, 11, ..., 20, 21, ... based on the stored-destination address information. Then, the search unit 48 selects the CAD drawing information or the equipment specification information, corresponding to the stored-source address information, from any of the databases 10, 11, ..., 20, 21, ... based on the search result. The selected information is displayed on a screen of the display 46.

Figure 3:
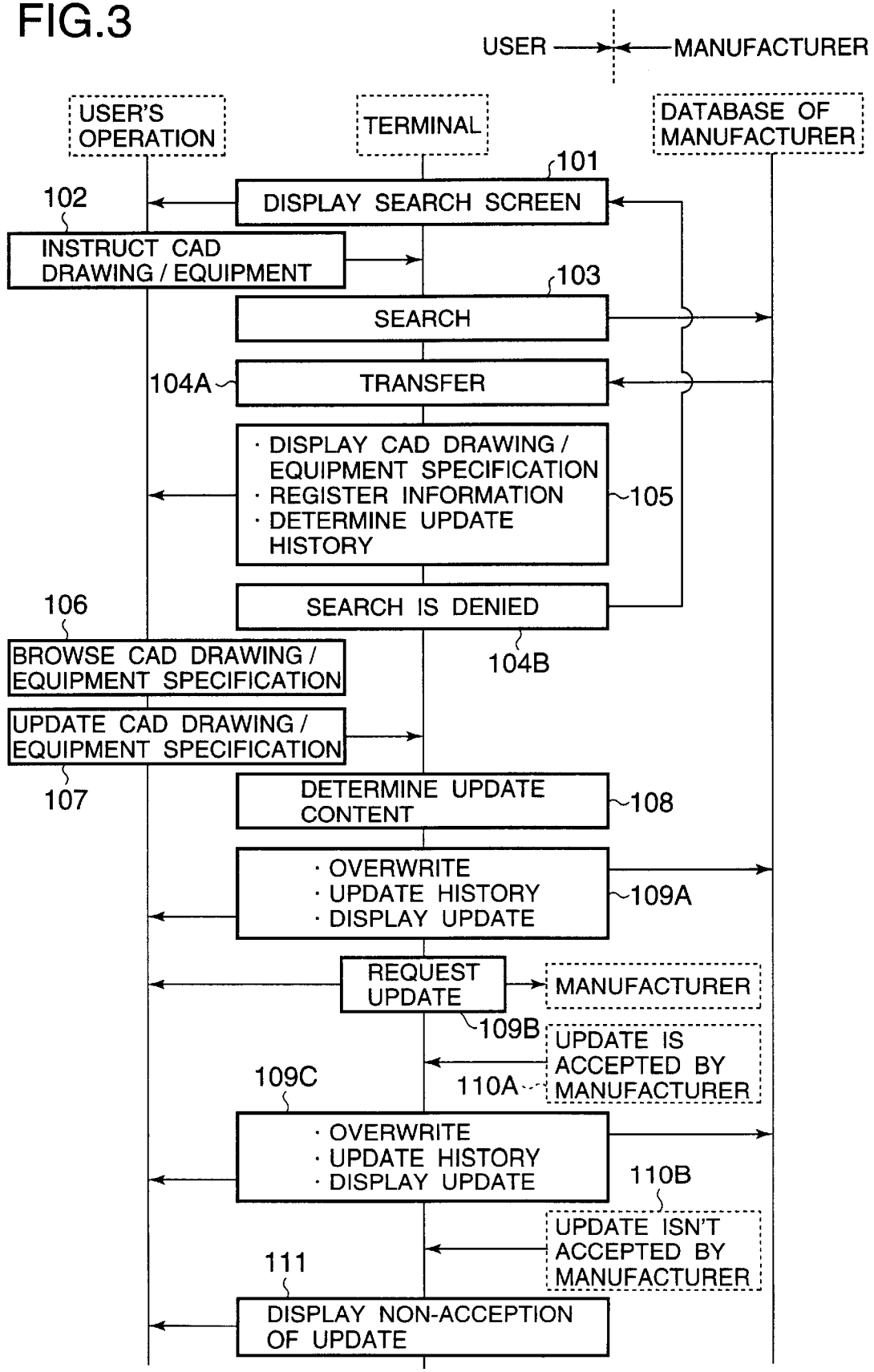
FIG. 3 is a flowchart for explaining operations of the CAD information management system shown in FIG. 1.

A description is given of a process for accessing the databases 10, 11, ..., 20, 21, ... searching for information, and browsing the search information, with reference to FIG. 3. First, a user operates the keyboard of the input unit 50, thereby starting the system. Then, a search screen of the CAD drawing is displayed on the screen of the display 46, and the CAD information management system enters a standby mode of an input operation (step 101). In this case, a list of the CAD drawing or the equipment specification formed by manufacturer is displayed, in addition to the data stored-destination address information such as an identification number of each of the databases 10, 11, ..., 20, 21, .... Incidentally, when the CAD drawing is displayed on the screen of the display 46, the CAD information management system is in the standby mode of the input operation until the user designates an operation for browsing the equipment specification.

When the display 46 displays the search screen or displays the list of the CAD drawing, a CAD drawing, a system, a name of the manufacturer, a name of each of the databases 10, 11, ..., 20, 21, ..., etc. are inputted in accordance with a user's click operation of the list or a user's keyboard operation. Then, the stored-destination address information is generated in accordance with the operation. Processing for searching for the information on the designated CAD drawing or equipment specification is executed in accordance with the stored-destination address information (step 103).

In step 103, the search unit 48 searches for the stored-source address information of each database, corresponding to the stored-destination address information, via the signal transmitting unit 45 and the communication line 30 in accordance with the data stored-destination address information such as the identification number of each of the databases 10, 11, ..., 20, 21, ... in which the information on the CAD drawing or the equipment specification is stored and the like.

In this case, the search unit 48 sequentially accesses the databases 10, 11, ..., 20, 21, ... which a plurality of manufacturers have, and searches for the stored-source address information corresponding to the stored-destination address information. In other words, if no designated information is obtained when the search unit 48 searches for one of the databases 10, 11, ..., 20, 21, ..., the search unit 48 accesses the other databases and repeats the search operation. When finding the stored-source address information corresponding to the stored-destination address, the search unit 48 transfers, from the designated database, the information on the CAD drawing or the equipment specification corresponding to the stored-source address information (step 104A)

Figure 4:
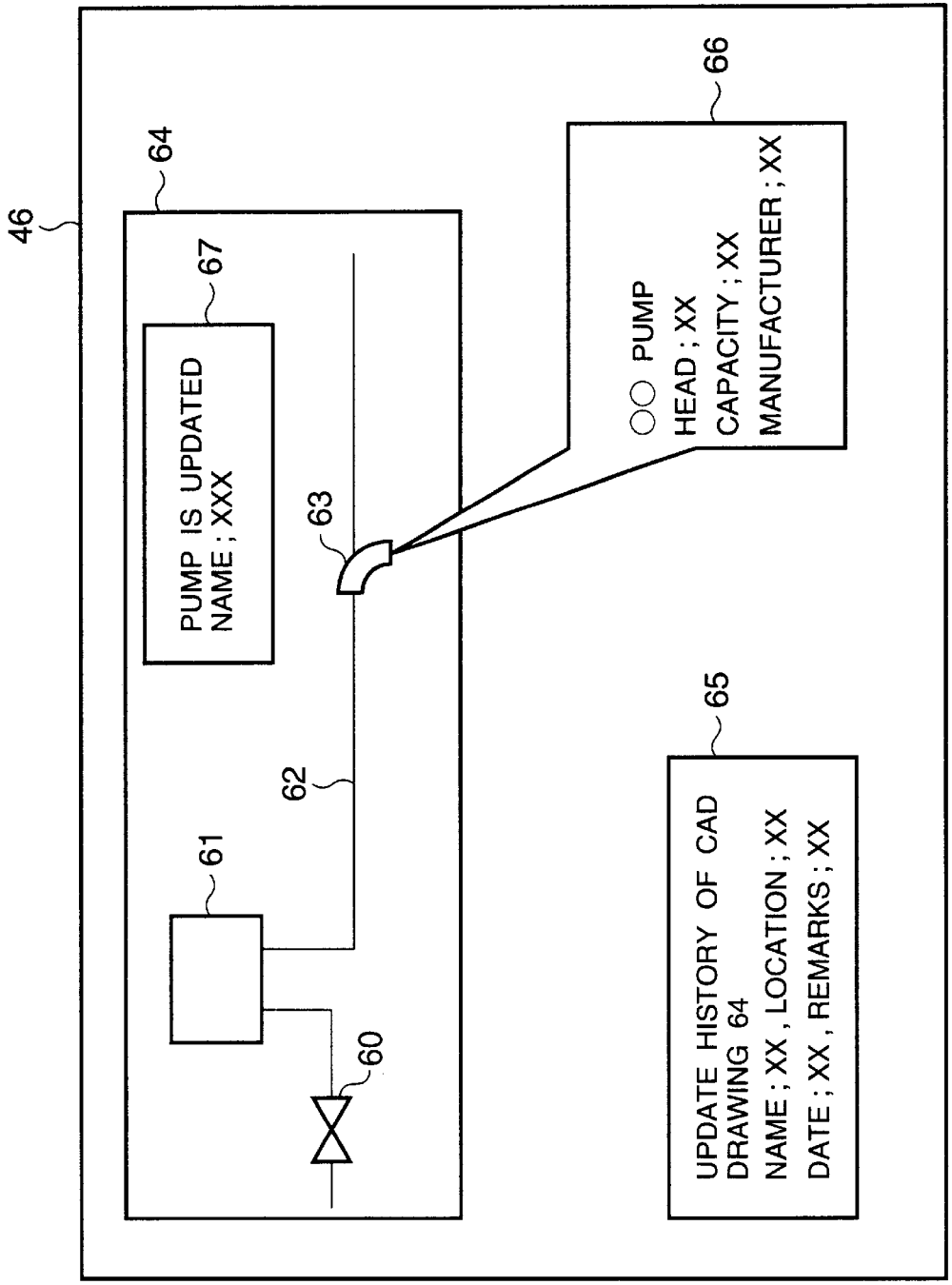
FIG. 4 is a diagram showing a display example of a CAD drawing.

When the designated information is transferred from the designated database, the transferred information is fetched to the display control unit 47 via the signal receiving unit 44, the content of the information is displayed on the screen of the display 46, and the data stored-destination address information is registered to the information registering unit 43 (step 105). The information determining unit 49 determines whether or not there is information on update history on the corresponding CAD drawing. FIG. 4 shows an example of a display screen in this case.

In this case, a CAD drawing 64 comprising a valve 60, equipment 61, a piping 62, and a pump 63 is displayed on the screen of the display 46. The update history of the CAD drawing 64 is displayed on a window 65. Information on the specification of the pump 63 is displayed on a window 66. Update information 67 on the update of the pump 63 is displayed on the CAD drawing screen 64.

On the other hand, when the information on the corresponding CAD drawing or the equipment specification is not found in step 103, such a fact is displayed on the screen of the display 46 and the processing routine returns to step 101 (step 104B).

When the information on the CAD drawing 64 or the equipment specification is displayed on the screen of the display 46 as shown in FIG. 4, the user can freely browse the information (step 106). In this case, since the user desirably operates the CAD information management system, the CAD information management system enters the standby mode. The user can also use various tools for browsing.

For example, when the user performs the operation for browsing the equipment specification which is displayed on the CAD screen 64, processing for searching for the information on the equipment specification is instructed, thereby starting the processing in step 103.

When updating the information on the CAD drawing 64 or the equipment specification due to the change of the CAD information management system, the user can update the information on the screen of the display 46 (step 107).

For example, the user can correct the information on the equipment specification of the pump 63 which is displayed on the screen of the display 46 and can correct a path of the piping 62.

After the above correcting or updating processing of the information is performed, the information determining unit 49 determines whether or not the update content is correct (step 108). That is, the information determining unit 49 determines whether or not the update content corresponds to the content of the information used by a specific user, e.g., information of the periodical check and, alternatively, whether or not the update content corresponds to the content shared by the manufacturers, e.g., the CAD drawing or the equipment specification.

In step 108, when the information determining unit 49 determines that the update content corresponds to the content of the information used by the specific user, the information determining unit 49 accesses one of the databases 10, 11, . . . , 20, 21, . . . , corresponding the data stored-destination address information which is registered to the information registering unit 43, and directly overwrites and corrects the dada which is stored in the corresponding database. Simultaneously, the information determining unit 49 updates the update history of the CAD drawing or the equipment specification, which is stored in the corresponding database, and displays the end of the update on the screen of the display 46 (step 109A).

In step 108, when the information determining unit 49 determines that the update content corresponds to the content shared by the manufacturers, first, the information determining unit 49 requests the update of the information to the manufacturer and requests the manufacturer for the acceptance of the update (step 109B). If the manufacturer accepts the update of the information, an information management apparatus (information management means) of the manufacturer transfers the notification of the acceptance of the update of the information to the user terminal 40. When the manufacturer inputs the notification of the acceptance of the update of the information to the user terminal 40, the information determining unit 49 accesses one of the databases 10, 11, . . . , 20, 21, . . . , corresponding to the data stored-destination address information which is registered to the information registering unit 43, and directly overwrites and corrects the data which is stored in the corresponding database. Simultaneously, the information determining unit 49 updates the update history of the CAD drawing or the equipment specification which is stored in the corresponding database, and displays the end of the update on the screen of the display 46 (step 109C).

In step 108, When the information determining unit 49 determines that the manufacturer dose not accept the update, the manufacturer transfers the notification indicating that the update is not accepted, to the user terminal 40. In this case, the information determining unit 49 displays a fact indicating that the update is not accepted, on the screen of the display 46 (step 111), and the process in this routine ends.

According to the first embodiment, even if the databases which different manufacturers have are distributionally provided, the CAD drawing information or the equipment specification information can be easily browsed by searching for the information from the user terminal 40 in accordance with the data stored-destination address information. The user can update the information within the acceptable content. Further, since the update history is displayed, the user can easily understand the update date, etc.

Hereinbelow, A description is given of a second embodiment of the present invention with reference to FIG. 5. According to the second embodiment, a server 70 is arranged between databases 10, 11, . . . , 20, 21, . . . and a user terminal 40. The databases 10, 11, . . . , 20, 21, . . . and the server 70 are connected via a communication line 30 such as the Internet. The server 70 and the user terminal 40 are connected via an information transfer path 71. If a user searches for necessary information on a CAD drawing or an equipment specification, he refers to address information of the CAD drawing or the equipment specification which is managed by data stored-destination address information, accesses one of the databases 10, 11, . . . , 20, 21, . . . based on the address information, and selects the information. Other components in FIG. 5 are similar to those in FIG. 1.

Next, a description is given of operations of the CAD information management system shown in FIG. 5 with reference to FIG. 6. Referring to FIG. 6, first, when the CAD information management system starts by a user's operation, a search screen is displayed on the screen of the display 46 and the CAD information management system enters a standby mode of an input operation. If the CAD drawing has been already displayed on the screen of the display 46, the CAD information management system is in the standby mode of the input operation until the user designates an operation for browsing the equipment specification (step 101).

When the screen of the display 46 indicates the search screen, the user clicks a designated column, directly inputs a number of the CAD drawing, a system, a name of a manufacturer, a name of the database, and the like via the keyboard, etc. Then, one or a plurality of a desired CAD drawings are designated (steps 102 and 106). In this case, when the CAD drawing has been already displayed, the user browses the equipment specification in the corresponding CAD drawing, clicks the equipment on the CAD drawing, or directly inputs an identification number of the equipment on the CAD drawing via the keyboard, thereby designating one or a plurality of pieces of desired equipment.

When the user clicks the designated column, information designated by the user is inputted to the search unit 48. The search unit 48 transfers the information inputted by the user to the server 70, and requests the search of the CAD drawing or the equipment specification (step 201). In this case, the server 70 searches for information on a corresponding relationship between the data stored-source address information, such as the identification number of each of the databases 10, 11, . . . , 20, 21, . . . and the information on the CAD drawing or the equipment specification which is registered to a memory in the server 70 in advance, obtains the stored-destination address information of the found information, and searches for the data stored-source address information of each of the databases 10, 11, . . . , 20, 21, . . . corresponding to the data stored-destination address information (step 202).

When the databases 10, 11, . . . , 20, 21, . . . are sequentially searched and the data stored-source address information is found corresponding to the data stored-destination address information, the server 70 issues an instruction for transferring the information on the CAD drawing or the equipment specification corresponding to the data stored-source address information, to one of the databases 10, 11, . . . , 20, 21 . . . . In response to the instruction, the one of the databases 10, 11, . . . , 20, 21, . . . transfers the designated information on the CAD drawing or the equipment specification to the user terminal 40 via the server 70 (step 203A).

When the server 70 transfers the information on the CAD drawing or the equipment specification to the user terminal 40, the search unit 48 displays the content of the information on the screen of the display 46, and registers the data stored-destination address information to the information registering unit 43 (step 105). Further, the search unit 48 determines whether or not there is the update history of the CAD drawing. If it is determined that there is the update history of the CAD drawing, the search unit 48 displays the update history on the screen of the display 46. If it is determined in step 202 that there is no corresponding information on the CAD drawing or the equipment specification, the server 70 transfers such a fact to the user terminal 40, and the processing routine returns to step 101 (step 203B).

Next, when the information from one of the databases 10, 11, . . . , 20, 21, . . . is transferred to the user terminal 40 via the server 70 and the content thereof is displayed on the screen of the display 46, the user can freely browse the information on the CAD drawing or the equipment specification, which is displayed on the screen of the display 46 (step 106).

In this case, since the user desirably operates the CAD information management system, the CAD information management system is in the standby mode. The user can use various tools for browsing.

If the user performs an operation for browsing the information on the equipment specification which is displayed on the CAD drawing, processing for searching for the information on the equipment specification is instructed, thereby starting the process in step 201.

If the user desires to correct or update the information on the CAD drawing or the equipment specification because of the change of the CAD information management system, the user can update the information on the screen of the display 46 (step 107).

When the user updates the information in step 107, the search unit 48 transfers the request for updating the information and the update content (step 204). In this case, the search unit 48 extracts the stored-destination address information, of the CAD drawing or the equipment specification which is requested to be updated, from the information registering unit 43 and transfers the extracted information to the server 70.

When the update is requested, the server 70 determines whether or not the update content is correct (step 205). For example, the server 70 determines whether or not the update content, e.g., the information on the periodic check corresponds to the content used by a specific user and, alternatively, whether or not the information on the CAD drawing or the equipment specification corresponds to the content shared by the manufacturer (step 205). In this case, if it is determined that the update content corresponds to the content used by the specific user, the server 70 accesses one of the databases 10, 11, . . . , 20, 21, . . ., corresponding to the data stored-destination address information as the information received from the user terminal 40, and directly overwrites and corrects the data of one of the databases 10, 11, . . . , 20, 21, . . . (step 206A). In this case, the update history of the CAD drawing or the equipment specification, which is stored in one of the databases 10 to 21, is updated and the end of the update is transferred to the user terminal 40.

When the notification of the update is received from the server 70, the user 40 displays the end of the update on the screen of the display 46 (step 207).

When the server 70 determines in step 205 that the update content corresponds to the content shared by the manufacturer, the server 70 requests the update of the information to the manufacturer and also requests the determination of the update thereto (step 206B).

When the manufacturer accepts the update of the information, the information management apparatus of the manufacturer transfers the notification indicating that the update of the information is accepted to the server 70 (step 208A).

When the server 70 determines in step 205 that the update content corresponds to the content used by the specific user, the server 70 accesses one of the databases 10, 11, . . . , 20, 21, . . ., corresponding to the stored-destination address information in accordance with the data received from the user terminal 40, and directly overwrites and corrects the data of one of the databases 10, 11, . . . , 20, 21, . . . (step 206A). In this case, the server 70 updates the update history, of the information on the CAD drawing or the equipment specification which is stored in one of the databases 10 to 21, and transfers the end of the update to the user terminal 40.

In the user terminal 40, when the notification of the update is received from the server 70, the search unit 48 displays the end of the update on the screen of the display 46 (step 207).

When the manufacturer does not accept the update of the information in step 206B, the manufacturer transfers the notification indicating that the update is not accepted, to the server 70, and the server 70 transfers the notification indicating that the update is not accepted, to the user terminal 40 (step 209). In this case, in the user terminal 40, the search unit 48 displays the notification indicating that the update is not accepted, on the screen of the display 46 (step 210), and the processing routine ends.

According to the second embodiment, even if the databases which different manufacturers have are distributionally provided, the CAD drawing information or the equipment specification information can be easily browsed by searching for the information in the databases from the user terminal 40 in accordance with the data stored-destination address information via the server 70. The user can update the information within the acceptable content.

Further, according to the second embodiment, differently from the case according to the first embodiment, the server 70 shares the processes which are performed by the server 70 and the user terminal 40. Consequently, the processing speed can be increased.

Furthermore, according to the second embodiment, since necessary information can be selected or updated, the order company of the power generation plant or the information manager can efficiently mange the information on the CAD drawing or the equipment specification.

What is claimed is:

1. A CAD information management system comprising:
   a plurality of databases which are located respectively at each manufacturer of a plurality of different manufacturers, for storing at least one of CAD drawing information and specification information on a specification of a component forming a CAD drawing and update history information of said at least one of the information, corresponding to stored-source address information; and
   a user terminal connected to said plurality of databases via a communication network, for receiving and transmitting information to/from said plurality of databases based on input information which is inputted by a user, wherein when stored-destination address information indicating a stored destination of information is inputted as input information on the stored-source address information, said user terminal searches for the stored-source address information, corresponding to said stored-destination address information inputted by a user in said plurality of databases which are managed by a plurality of different manufacturers, selects at least one of the CAD drawing information and the specification information, corresponding to the stored-source address information, from any of said plurality of databases, based on the search result, displays the selected information, and also displays update information on the selected information.

2. A system according to claim 1, further comprising:

information management means for managing at least one of the CAD drawing information and the specification information, wherein said plurality of databases which are located respectively at each manufacturer of a plurality of different manufacturers are connected to said information management means, said information management means outputs a result of determining whether or not the update request from a user terminal is accepted, to said user terminal, and when receiving the result of determining that the update request is accepted from said information management means, said user terminal updates at least one of the CAD drawing information and the specification information in said plurality of databases, and adds the update history information on the update to the update information.

3. A system according to claim 2, wherein at least one of the CAD drawing information and the specification information is stored in an overlappingly manner in said plurality of databases.

4. A CAD information management system comprising:

a plurality of databases which are located respectively at each manufacturer of a plurality of different manufacturers, for storing at least one of CAD drawing information and specification information on a specification or a component forming a CAD drawing, corresponding to stored-source address information; and a user terminal connected to said plurality of databases via a communication network, for receiving and transmitting information to/from said plurality of databases based on input information which is inputted by a user, wherein when stored-destination address information indicating a stored destination of information is inputted as input information on the stored-source address information, said user terminal searches for the stored-source address information, corresponding to said stored-destination address information inputted by a user, of any of said plurality of databases which are managed by a plurality of different manufacturers, selected information corresponding to the stored-source address information from any of said plurality of databases based on the search result, and outputs the selected information.

5. A system according to claim 4, wherein at least one of the CAD drawing information and the specification information is overlappingly stored in said plurality of databases.

6. A CAD information management system comprising:

a plurality of databases for which are located respectively at each manufacturer of a plurality of different manufacturers, for storing at least one of CAD drawing information and specification information on a specification of a component forming a CAD drawing, together with update history information of said at least one of the information, corresponding to stored-source address information;

a server which is arranged at a user side, connected to said plurality of databases via a communication network, for receiving and transmitting information to/from said plurality of databases; and a user terminal connected to said server via an information transfer path, for receiving and transmitting information to/from said server based on input information which is inputted by a user, wherein when information on a stored destination of information is inputted as input information on the stored-source address information, said user terminal requests a search in accordance with the input information to said server and displays the search result of said server, said server extracts the stored-destination address information corresponding to the information in response to the search request from said user terminal, searches for the stored-source address information, corresponding to said extracted stored-destination address information, in said plurality of databases which are managed by a plurality of different manufacturers, selects at least one of the CAD drawing information and the specification information, corresponding to the stored-source address information, from any of said plurality of databases, based on the search result, also selects update history information added to said at least one of the information, and transfers the selected information to said user terminal.

7. A CAD information management method comprising the steps of:

by an information management apparatus connected to a communication network, storing at least one of CAD drawing information and a specification of a component forming a CAD drawing to a plurality of databases which are located respectively at each manufacturer of a plurality of different manufacturers corresponding to stored-source address information, and connecting said databases to a user terminal via the communication network; and by said user terminal, searching for the stored-source address information, corresponding to said stored-destination address information inputted by a user, in said plurality of databases which are located respectively at each manufacturer of a plurality of different manufacturers, selecting information corresponding to the stored-source address information from any of said databases based on the search, and displaying the selected information, when inputting the stored-destination address information to said user terminal, as input information on the stored-source address information, in the case in which said information management apparatus manages the CAD drawing information and the specification information that are stored in said plurality of databases.

8. A method according to claim 7, further comprising the steps of:

by said information management apparatus, outputting a result of determining whether or not an update request from said user terminal is accepted, to said user terminal, when the update request is inputted to said information management apparatus from said terminal; and by said user terminal, updating at least one of the CAD drawing information and the specification information in said plurality of databases, when receiving the result of determining that the update request from said information management apparatus is accepted, and adding update history information on update to the update information.

9. A CAD information management method, comprising the steps of:

by an information management apparatus connected to a communication network, storing at least one of CAD drawing information and specification information on a specification of a component forming a CAD drawing and update history information of said at least one of the information, in a plurality of databases which are located respectively at each manufacturer of a plurality of different manufacturers, corresponding to stored-source address information, connecting said plurality of databases to a server which is arranged at a user side via the communication network, and connecting said server to a user terminal via an information transfer path;

by said user terminal, requesting a search in accordance with input information, to said server, and displaying the search result of said server; and by said server, extracting stored-destination address information corresponding to said information in response to the search request from said user terminal, searching for the stored-source address information, corresponding to said stored-destination address information which is extracted, in said plurality of databases which are located respectively at each manufacturer of a plurality of different manufacturers based on the stored destination address information, selecting at least one of the CAD drawing information and the specification information, corresponding to the stored-source address information, from any of said plurality of databases, selecting update history information added to the selected information, and transferring the selected information to said user terminal, when information on a stored destination of information is inputted to said user terminal as the input information on the stored-source address information in the case in which said information management apparatus manages the CAD drawing information and the specification information which are stored in said plurality of databases.

* * * * *